(12) United States Patent
McArdell et al.

(10) Patent No.: US 10,499,012 B2
(45) Date of Patent: Dec. 3, 2019

(54) SYSTEM AND A METHOD FOR SWITCHING FOCUS AND A CONNECTOR

(71) Applicants: Roger Nicholas McArdell, Dartford (GB); Roger Alan Vinton, Dartford (GB)

(72) Inventors: Roger Nicholas McArdell, Dartford (GB); Roger Alan Vinton, Dartford (GB)

( * ) Notice: Subject to any disclaimer, the term of this patent is extended or adjusted under 35 U.S.C. 154(b) by 0 days.

(21) Appl. No.: 15/906,537

(22) Filed: Feb. 27, 2018

(65) Prior Publication Data
US 2018/0249123 A1  Aug. 30, 2018

(30) Foreign Application Priority Data

Feb. 28, 2017  (GB) .................... 1703165.9

(51) Int. Cl.
*H04N 7/14* (2006.01)
*H04N 7/15* (2006.01)
*H04L 29/06* (2006.01)

(52) U.S. Cl.
CPC ........... *H04N 7/15* (2013.01); *H04L 65/1069* (2013.01); *H04L 65/1089* (2013.01); *H04L 65/403* (2013.01); *H04L 65/4038* (2013.01)

(58) Field of Classification Search
CPC ... G01S 5/0072; G06F 17/3028; H04L 12/18; H04L 63/102; H04L 63/105; H04L 65/1069; H04L 65/1089; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185
USPC ........ 348/14.01, 14.02, 14.03, 14.04, 14.05, 348/14.06, 14.07, 14.08, 14.09, 14.1, 348/14.11, 14.12, 14.13, 14.14, 15.15,
(Continued)

(56) References Cited

U.S. PATENT DOCUMENTS 5,600,310 A * 2/1997 Whipple, III ...... G05B 19/0423
                                                    307/11
6,314,479 B1 * 11/2001 Frederick ............... G09G 5/006
                                                    348/E5.105
(Continued)

FOREIGN PATENT DOCUMENTS

CN         2701199 Y      5/2005

OTHER PUBLICATIONS

Search Results for corresponding UK Patent Application No. GB 1703165.9, dated Jul. 19, 2017.
(Continued)

*Primary Examiner* — Khai N. Nguyen
(74) *Attorney, Agent, or Firm* — Hauptman Ham, LLP

(57) ABSTRACT

A system for switching focus between devices participating in a communication session, the system comprising a connector to link a device to a master control apparatus, the connector including a one-wire bidirectional serial bus, wherein the connector is configured to transmit a signal to the master controller representing a focus request for the device in question.

12 Claims, 3 Drawing Sheets

(58) Field of Classification Search
USPC .................. 348/14.16; 379/265.03; 382/275; 455/414.1, 566; 704/270
See application file for complete search history.

(56) References Cited

U.S. PATENT DOCUMENTS

| | | | | |
|---|---|---|---|---|
| 8,700,772 B2* | 4/2014 | Saint Clair | ............ | G05B 15/00 709/225 |
| 8,909,779 B2* | 12/2014 | Clair | ..................... | H04L 67/125 386/326 |
| 9,191,817 B1* | 11/2015 | Paczkowski | ............ | H04W 4/02 |
| 9,529,514 B2* | 12/2016 | Saint Clair | ............ | G05B 15/00 |
| 9,888,091 B2* | 2/2018 | Saint Clair | ............ | G05B 15/00 |
| 2005/0101314 A1* | 5/2005 | Levi | ................... | G08B 21/0238 455/423 |
| 2009/0083374 A1* | 3/2009 | Saint Clair | ............ | G05B 15/00 709/203 |
| 2010/0013905 A1 | 1/2010 | Kumar | | |
| 2012/0166642 A1* | 6/2012 | Saint Clair | ........... | H04L 67/125 709/225 |
| 2013/0067121 A1* | 3/2013 | Beel | ...................... | H04M 3/567 710/20 |
| 2014/0152576 A1* | 6/2014 | Kim | .................... | G06F 3/03545 345/169 |
| 2014/0309790 A1* | 10/2014 | Ricci | ....................... | H04W 4/21 700/276 |
| 2014/0317507 A1* | 10/2014 | Saint Clair | ............ | G05B 15/00 715/719 |
| 2015/0033146 A1 | 1/2015 | Wu | | |
| 2015/0089332 A1* | 3/2015 | Chambers | ......... | H03M 13/6306 714/807 |
| 2016/0050315 A1* | 2/2016 | Malhotra | .............. | H04M 3/436 455/414.1 |
| 2016/0100099 A1 | 4/2016 | Oyman | | |
| 2016/0188506 A1* | 6/2016 | Wang | .................... | G06F 13/287 710/106 |
| 2016/0357699 A1* | 12/2016 | Shamarao | ........... | G06F 13/4282 |
| 2017/0126838 A1* | 5/2017 | Saint Clair | ............ | G05B 15/00 |
| 2018/0249123 A1* | 8/2018 | Mcardell | ............. | H04L 65/1069 |

OTHER PUBLICATIONS

Search Results for corresponding EP Patent Application No. 18158997.9, dated Jul. 19, 2018.

* cited by examiner

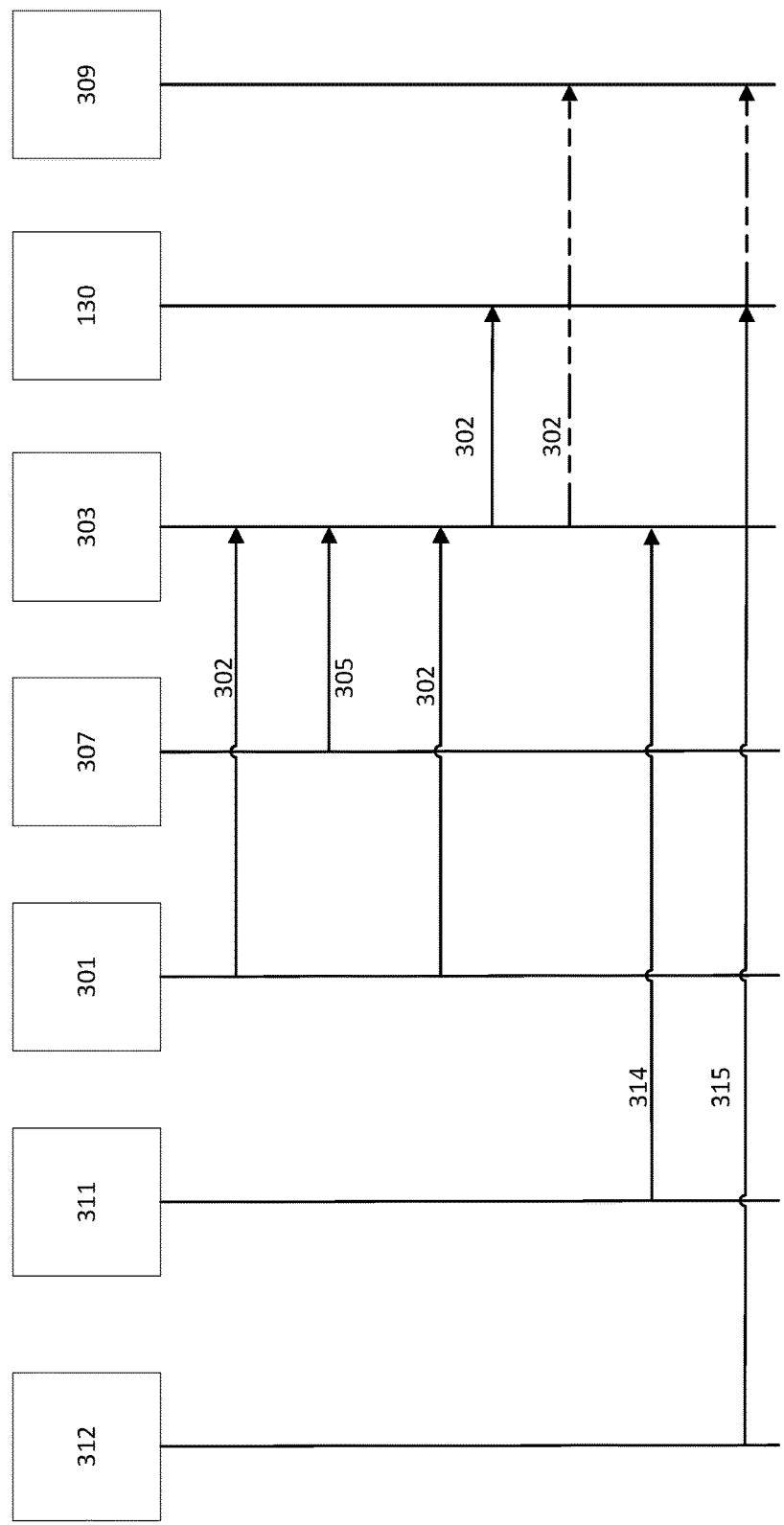

SYSTEM AND A METHOD FOR SWITCHING FOCUS AND A CONNECTOR

BACKGROUND OF THE INVENTION

Field of the Invention

Aspects relate, in general, to a system and a method for switching focus and to a connector.

Discussion of the Background

A network, such as video conference network for example, can be used to interconnect a number of terminals in a communicating relationship so that each terminal can participate in a communication session, such as a video conference for example. A terminal or device in a communication session may include one or more outputs to enable it to be linked to the network and/or multiple other devices, such as computers, data sources, audio inputs, video inputs, audio outputs, video outputs, user interface devices such as digital whiteboards, and so on.

BRIEF SUMMARY OF THE INVENTION

According to an example, there is provided a system for switching focus between devices participating in a communication session, the system comprising a connector to link a device to a master control apparatus, the connector including a one-wire bidirectional serial bus, wherein the connector is configured to transmit a signal to the master controller representing a focus request for the device in question. The connector can include an actuator configured to generate the signal representing the focus request. The connector can include an audio and/or visual feedback means configured to provide an indication of focus. The master control apparatus can accept multiple connectors whereby to link multiple devices thereto. The master control apparatus can, in response to a signal received from a connector, switch or modify a display of the system.

According to an example, there is provided a method for switching focus between devices participating in a communication session, the method comprising using a connector linking a device to a master control apparatus and comprising a one-wire bidirectional serial bus, generating a signal representing an instruction to modify or switch focus to the device. Generating a signal can include actuating a button or switch on the connector. The method can further comprise generating an audio and/or visual feedback signal whereby to provide an indication of a switch of focus and/or focus. The method can further comprise linking multiple connectors, whereby to link multiple devices, to the master control apparatus. The method can further comprise, in response to a signal received from a connector, switching or modifying a display of the system to provide session focus for the device. The method can further comprise, at the master control apparatus, detecting the signal representing the instruction to modify or switch focus to the device and modifying a display input to give focus to the device. The method can further comprise modifying a coloured visual output of the connector in response to generating a signal representing an instruction to modify or switch focus to the device.

According to an example, there is provided a connector to switch focus between devices participating in a communication session, the connector to link a device to a master control apparatus and comprising a one-wire bidirectional serial bus, the connector configured to generate a signal representing an instruction to modify or switch focus to the device. The connector can comprise an actuator configured to generate the signal representing the focus request. The connector can comprise an audio and/or visual and/or haptic feedback means configured to provide an indication of focus.

BRIEF DESCRIPTION OF THE SEVERAL VIEWS OF THE DRAWING

Embodiments will now be described, by way of example only, with reference to the accompanying drawings, in which:

FIG. 3 is a schematic representation of a message flow according to an example.

DETAILED DESCRIPTION OF THE INVENTION

Figure 1:
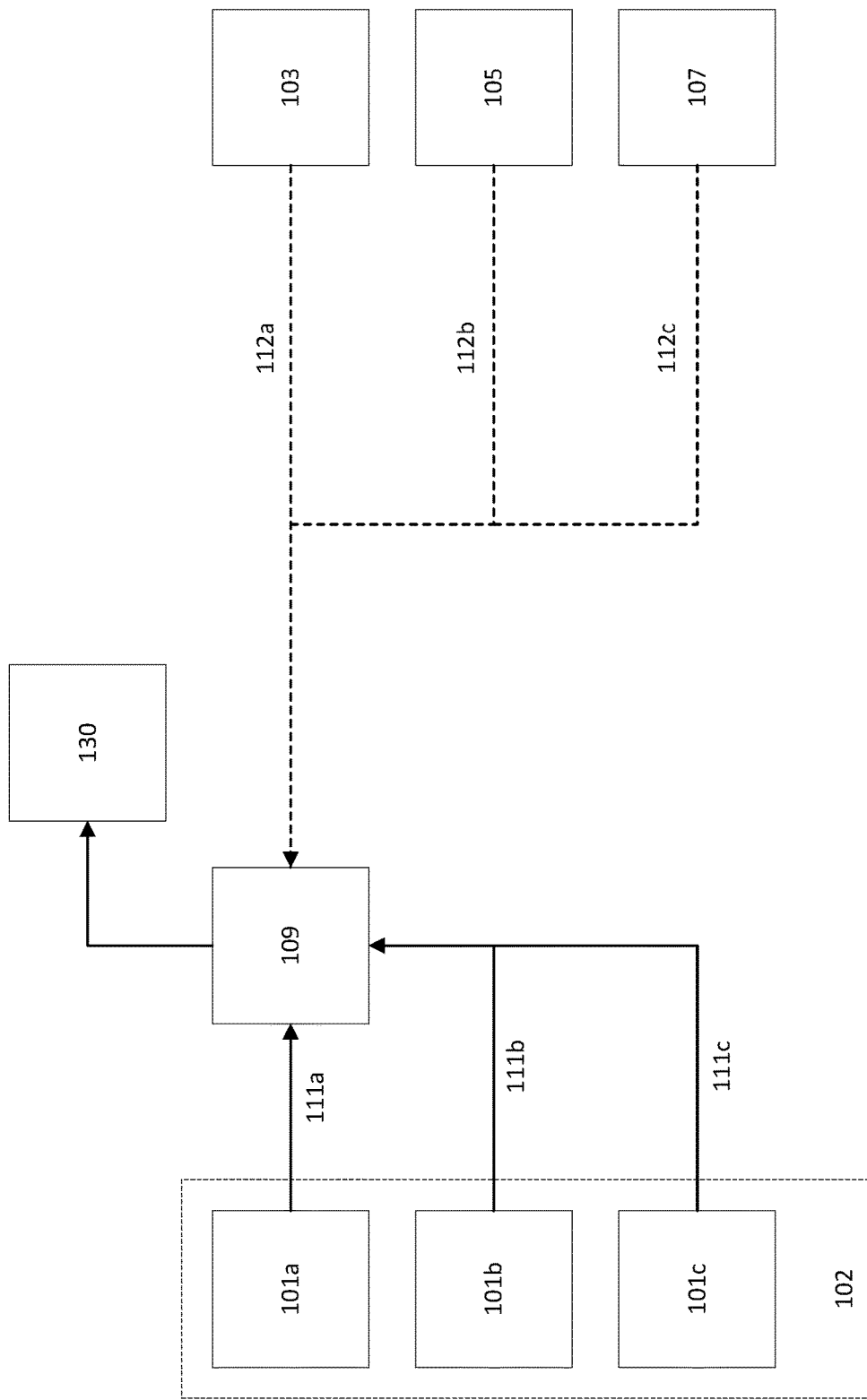
FIG. 1 is a schematic representation of a system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein. The term 'focus' as used herein indicates an apparatus which is selected to provide an audio and/or visual input in a communication system that is audible and/or visible to other session participants. Accordingly, an apparatus engaged or participating in a communication session with multiple other parties will have focus if other the other participants can see or hear (or both) the information produced by that apparatus. Focus may shift from the apparatus to another participant. In this connection, a request for focus can be an indication from an apparatus or user of that apparatus to signal that a participant wishes to share some information with other participants. The request may be denied or granted automatically, thereby shifting focus to that participant, or manually, such as by another participant or participants. Put another way, an apparatus (or participant/party) that has focus has the floor in a communication session.

FIG. 1 is a schematic representation of a system according to an example. Multiple apparatus can participate in a communication session. For example, multiple apparatus can be communicatively linked both locally and/or remotely from one another in order to engage in a videoconferencing session. FIG. 1 depicts two such sets of apparatus. Apparatus 101a-c and apparatus 103, 105 and 107. Apparatus 101a-c are within the same geographic locality 102, such as the same room, and are connected to a master control apparatus 109 using respective connectors 111a-c to link the apparatus 101a-c to the control apparatus 109. In the example of FIG. 1, apparatus 103, 105 and 107 are geographically remote from the group 101a-c and from one another, such as in different buildings or different rooms within the same building, and can be remotely connected to the control apparatus 109 over wired or wireless (or combination of the two) links 112a-c in order to take part in the communication session. It will be appreciated that participants in a session may all be local to one another, all remote from another or a combination of the two.

The control apparatus enables the respective apparatus 101a-c, 103, 105 and 107 to simultaneously send and receive data representing images and audio using bidirectional digital transmission paths. Such systems are known, and will not be described in any more detail.

The connectors 111a-c link terminals (apparatus) in a communication session to the control apparatus 109 and, in an example, comprise one-wire bidirectional serial buses. According to an example, a connector can transmit a signal to the master controller 109 representing a focus request for the apparatus in question. An apparatus that has focus in this context can be the apparatus which is used to provide still, video, audio and/or data information that is visible or otherwise consumable by other participants engaging in the session. Put another way, a device that has focus can be thought of as having the floor in a session, such that audio and/or video data and so on that are displayed/output on the device in question can also be output (e.g. visible and/or audible) on a system display, which can be a larger form factor display apparatus in a dedicated room for example, or a display that is wall, floor or desk mounted and can be configured to be used in a session. That is, a user can switch focus such that they have the floor in a session using a connector.

Figure 2:
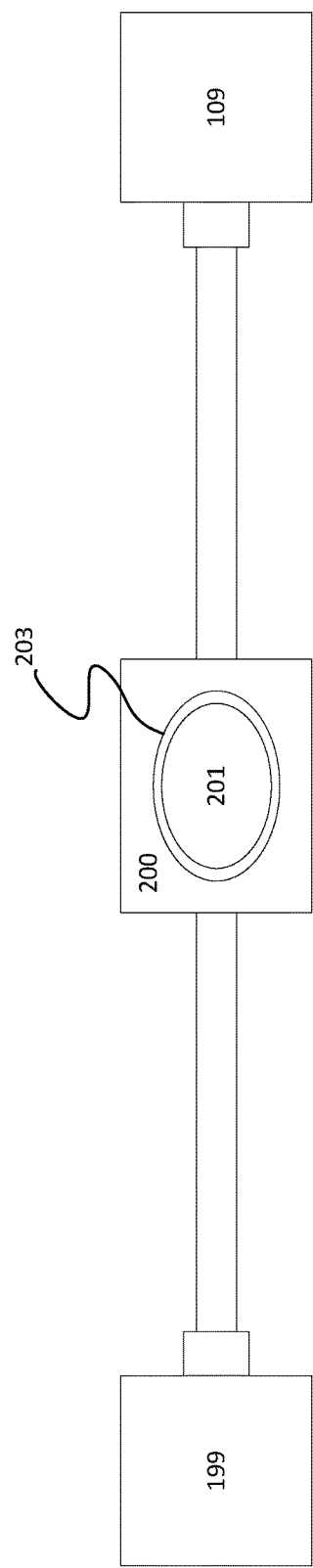
FIG. 2 is a schematic representation of a connector according to an example.

FIG. 2 is a schematic representation of a connector according to an example. Connector 200 includes an actuator 201 configured to generate the signal representing a focus request. That is, the actuator 201 can be used to generate data that is transmitted to the control apparatus, which data represents a request for the apparatus linked to the control apparatus by the connector in question to be given focus or the floor within the communication session taking place. A connector can comprise a one-wire bidirectional serial bus. This can be provided as part of a larger set of connections (wires) that enable the apparatus in question to be bi-directionally communicatively coupled to the control apparatus of the system. As such, focus request data can be transmitted using the same wired connection that provides audio-visual communications functionality for the apparatus or terminal for example.

In an example, the connector can include an audio and/or visual feedback means 203 configured to provide an indication of focus and/or a request for focus. For example, the feedback means 203 can comprise a light that is configured to display different colours depending on a certain parameter or condition. For example, if the apparatus 199 connected to the master controller 109 using the connector 200 does not have focus, the light can illuminate red. If focus is requested, the light can illuminate orange, and this can change to green if or when the apparatus has focus. Other alternatives are clearly possible and may include augmentation by audio, such as beeps and so on to indicate actuation and/or a change in condition. Alternatively, instead of visual feedback, purely auditory feedback may be provided. It is of course possible that tactile or haptic feedback can be used.

In an example, the master control apparatus 109 is configured to accept multiple connectors whereby to link multiple devices thereto. That is, multiple participants in a communication session, which can be a videoconference for example, can connect devices, such as laptops and so on, so the control apparatus 109 in order to enable the participants to be able to participate in the session. This may be a session that includes remote participants, or participants who are local to one another, including participants in the same room for example.

According to an example, the connection of the devices to the control apparatus 109 can use a connector as described above, thereby enabling a participant to shift focus to their device. For example, a main display 130 of the system can be used to enable local participants to view and listen to visual and audio data as part of the communication session. Also, if present, remote participants can view and listen to visual and audio data as part of the communication session on a display that is local to them, such as a display of a device that is engaged in the session, or a communal display for multiple participants at a given location. The master control apparatus is configured, in response to a signal received from a connector, to switch or modify a display 130 of the system. Accordingly, a participant may be 'given the floor' and take over control of the display 130 and/or a remote display for other participants in order to enable them to present audio and/or visual data to the other session participants. In this connection, the control apparatus 109 can be configured to adjust an input for the display 130 in response to a request for focus. That is, when the control apparatus receives a request for focus, it can switch an input for display 130 to the apparatus associated with the request. The main display can provide an indication of the user or device that currently has focus and/or an indication of the or each user or device that has requested focus. This can be an audible and/or visual indication or cue.

FIG. 3 is a schematic representation of a message flow according to an example. Apparatus 301, such as a laptop for example, is connected to a master control apparatus 303 of a communication system. The master control apparatus 303 interconnects a number of apparatus in a communicating relationship so that each can participate in a communication session, such as a video conference for example. Apparatus 301 can provide audio and/or visual data 302 to apparatus 303. A display 130 of the system can be used to provide audio and video information to participants, and the display 130 can mirror, fully or partially, the display of an apparatus of a participant. For example, display 130 can provide the same view or output as the display 301, or can provide a screen-in-screen function to provide a smaller window with output from apparatus 301.

Data representing a request for focus 305 can be transmitted from the connector 307 connecting the apparatus 301 to the master control apparatus 303. That is, upon actuation of, for example, a button on connector 307, data can be generated and transmitted to the master control apparatus 303 indicating that the apparatus 301 should be used as the input for the display 130 and/or 309. The button can be part of existing cabling that is also used to carry audio and visual data feeds, for example for a video conference. Accordingly, audio and/or visual data 302 can be provided by control apparatus 303 to display 130 and or 309 (which may include remote display devices as mentioned above). At a subsequent point in time of the session, another participant using an apparatus 312 connected to control apparatus 303 using a connector 311 may request focus 314 by actuating the button. Accordingly, audio and/or visual data 315 can be provided by control apparatus 303 to display 130 and or 309, thereby shifting focus from apparatus 301 to 312.

In an example, the button forms part of the existing cabling structure and can be integrated to use a single wire data bus or one-wire bidirectional serial bus. The actuator can be integrated with existing connectors, such as those found in High Definition Multimedia Interface (HDMI) or Video Graphics Array (VGA) connectors. The actuator can be communicatively coupled to one pin of the connector, for example the consumer electronics control (CEC) of a HDMI connector, to enable switching between the focus requests (e.g. the actuator can be connected to a circuit which can send data over the single wire in response to the actuator being actuated). The single pin or single wire data bus may be shared between the participants of a communication session such as a video conference meeting. The single pin or single wire data bus selected for integration with the actuator can be a redundant or unused part of the existing cabling. A single wire data bus on existing cabling can be used to both send data for focus requests to the master control apparatus when the actuator or button is actuated, and to provide LED colour change signals in the other direction. As such, when an apparatus linked to the connector requests focus, the single wire data bus in the connector can send the focus request to the master control apparatus and can send a colour change signal to an LED at the actuator or button. The data to control the focus request and colour change signal or indicator can be sent over HDMI or VGA cabling using an otherwise redundant, single wire data bus without interrupting the HDMI or VGA audio and visual signals, i.e. without interrupting the audio and video feed.

Data representing a request for focus 305 can include an identifier for the apparatus 301. Similarly, data representing a request for focus 314 can include an identifier for the apparatus 312 and so on. In an example, the identifier can be a unique numerical reference for the apparatus. The control apparatus can be preconfigured with a list of apparatus and their associated numerical references. Alternatively, a list can be populated as apparatus are connected to the control apparatus with the control apparatus assigning the next available identifier for an apparatus at connection or once a handshake process has been completed for example.

In an example, a control apparatus 303 can be configured to act as gate that effectively controls access to a display 130. That is, multiple devices participating in a session can be connected to the apparatus 303, which then acts as an arbiter to determine which device has focus in the session. The apparatus 303 can therefore be configured as a switch that is able to switch input to display 130 from multiple input sources. Focus can be given to any device that requests it. Alternatively, a device requesting focus may be given focus after a predetermined period of time, or if another user (who has focus) indicates that they no longer require or desire it. For example, a user with focus may actuate button 201 to indicate to apparatus 303 that focus is no longer required and the apparatus 303 can then pass focus to the next user who has requested it. Apparatus 303 may therefore maintain a list of focus requests in order to determine who may be next in the queue to receive focus for example.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A system for switching focus between devices participating in a communication session, the system comprising:
   a device;
   a master control apparatus; and
   a connector linking the device to the master control apparatus, the connector including an actuator and a one-wire bidirectional serial bus coupling the device to the master control apparatus,
   wherein the actuator is configured to trigger a signal representing a focus request and the one-wire bidirectional serial bus is configured to transmit the signal, when the actuator is activated, to the master control apparatus representing the focus request,
   wherein the focus request is a request to the master control apparatus to provide information from the device to other devices participating in the communications session, and
   wherein the connector is part of cabling for carrying audio and visual signals for the communication session from the device to the master control apparatus.

2. The system as claimed in claim 1, wherein the connector includes an audio and/or visual feedback means configured to provide an indication of focus.

3. The system as claimed in claim 1, wherein the master control apparatus is configured to accept multiple connectors to link multiple devices thereto.

4. The system as claimed in claim 1, wherein the master control apparatus is configured, in response to a signal received from the connector, to switch or modify a display of the system.

5. A method of switching focus between devices participating in a communication session, the method comprising:
   using a connector to link a device to a master control apparatus, the connector comprising an actuator and a one-wire bidirectional serial bus coupling the device to the master control apparatus, and
   generating a signal representing an instruction to modify or switch focus to information from the device to other devices participating in a communication session by actuating the actuator on the connector, the one-wire bidirectional serial bus being configured to transmit the signal, when the actuator is activated, to the master control apparatus,
   wherein the connector is part of cabling for carrying audio and visual signals for the communication session from the device to the master control apparatus.

6. The method as claimed in claim 5, further comprising generating an audio and/or visual feedback signal to provide an indication of a switch of focus and/or focus.

7. The method as claimed in claim 5, further comprising linking multiple connectors, to link multiple devices, to the master control apparatus.

8. The method as claimed in claim 5, further comprising, in response to a signal received from the connector, switching or modifying a display of the system to provide session focus for the device.

9. The method as claimed in claim 8, further comprising, at the master control apparatus, detecting the signal representing the instruction to modify or switch focus to the device and modifying a display input to give focus to the device.

10. The method as claimed in claim 5, further comprising modifying a coloured visual output of the connector in response to generating a signal representing an instruction to modify or switch focus to the device.

11. A connector to switch focus between devices participating in a communication session, the connector to link a device to a master control apparatus and comprising:

an actuator; and a one-wire bidirectional serial bus for coupling the device to the master control apparatus, the actuator configured to generate a signal representing an instruction to modify or switch focus to the device, and the one-wire bidirectional serial bus is configured to transmit the signal, when the actuator is activated, to the master control apparatus representing the focus request for the device, wherein the focus request is a request to the master control apparatus to provide information from the device to other devices participating in the communications session, and wherein the connector is part of cabling for carrying audio and visual signals for the communication session from the device to the master control apparatus.

12. The connector as claimed in claim 11, further comprising an audio and/or visual feedback means configured to provide an indication of focus.

* * * * *